(12) United States Patent
Tiirola et al.

(10) Patent No.: US 10,462,795 B2
(45) Date of Patent: Oct. 29, 2019

(54) METHOD, APPARATUS AND COMPUTER PROGRAM FOR WIRELESS COMMUNICATIONS

(71) Applicant: NOKIA SOLUTIONS AND NETWORKS OY, Espoo (FI)

(72) Inventors: Esa Tapani Tiirola, Kempele (FI); Frank Frederiksen, Klarup (DK); Kari Pekka Pajukoski, Oulu (FI)

(73) Assignee: Nokia Solutions and Networks Oy, Espoo (FI)

( * ) Notice: Subject to any disclaimer, the term of this patent is extended or adjusted under 35 U.S.C. 154(b) by 74 days.

(21) Appl. No.: 15/023,888

(22) PCT Filed: Sep. 25, 2013

(86) PCT No.: PCT/EP2013/069996
§ 371 (c)(1),
(2) Date: Mar. 22, 2016

(87) PCT Pub. No.: WO2015/043633
PCT Pub. Date: Apr. 2, 2015

(65) Prior Publication Data
US 2016/0242188 A1 Aug. 18, 2016

(51) Int. Cl.
*H04W 72/08* (2009.01)
*H04L 5/14* (2006.01)
(Continued)

(52) U.S. Cl.
CPC ........ *H04W 72/082* (2013.01); *H04B 7/0626* (2013.01); *H04L 5/14* (2013.01); *H04W 4/06* (2013.01); *H04W 24/10* (2013.01); *H04W 72/042* (2013.01); *H04W 72/0413* (2013.01); *H04W 72/0446* (2013.01)

(58) Field of Classification Search
CPC ............. H04W 24/10; H04W 72/1231; H04W 72/0446; H04W 72/082; H04W 72/0413; H04W 4/06; H04L 5/14; H04B 7/0626
See application file for complete search history.

(56) References Cited

U.S. PATENT DOCUMENTS

| | | | | |
|---|---|---|---|---|
| 2004/0151235 A1* | 8/2004 | Olson | ................... | H04B 1/7103 375/148 |
| 2009/0285169 A1* | 11/2009 | Yang | ................... | H04W 52/143 370/329 |
| 2011/0081865 A1* | 4/2011 | Xiao | ................... | H04W 52/243 455/63.1 |

FOREIGN PATENT DOCUMENTS

| | | |
|---|---|---|
| WO | 02/062121 A2 | 8/2002 |
| WO | 2012/107102 A1 | 8/2012 |
| WO | 2015/043628 A1 | 4/2015 |

OTHER PUBLICATIONS

R1-132296; Nokia Siemens Networks, et al.; „On CSI measurements for eIMTA; 3GPP TSG-RAN WG1 Meeting #73; Fukuoka, Japan, May 20-24, 2013.
(Continued)

*Primary Examiner* — Yemane Mesfin
*Assistant Examiner* — Henry Baron
(74) *Attorney, Agent, or Firm* — Brake Hughes Bellermann LLP

(57) ABSTRACT

A method comprising: measuring separately co-channel interference and cross-channel interference at an apparatus; and providing, to a node, separate information regarding the co-channel interference and the cross-channel interference.

19 Claims, 9 Drawing Sheets

(51) Int. Cl.
    *H04W 72/04*     (2009.01)
    *H04W 4/06*     (2009.01)
    *H04W 24/10*     (2009.01)
    *H04B 7/06*     (2006.01)

(56) References Cited

OTHER PUBLICATIONS

International Search Report and Written Opinion for International Application No. PCT/EP2013/069996, dated Jun. 20, 2014, 14 pages.

* cited by examiner

| Candidate 1 | subframe n | | |
|---|---|---|---|
| | n | n+1 | n+2 |
| Cell A | UL | DL | DL |
| Cell B | UL | DL | DL |
| Cell C | UL | DL | DL |

| Candidate 2 | subframe n | | |
|---|---|---|---|
| | n | n+1 | n+2 |
| Cell A | UL | DL | DL |
| Cell B | DL | UL | DL |
| Cell C | DL | DL | UL |

| Candidate 3 | subframe n | | |
|---|---|---|---|
| | n | n+1 | n+2 |
| Cell A | UL | DL | DL |
| Cell B | DL | UL | DL |
| Cell C | DL | UL | DL |

FIGURE 11

METHOD, APPARATUS AND COMPUTER PROGRAM FOR WIRELESS COMMUNICATIONS

This application is a national stage entry of PCT Application No. PCT/EP2013/069996, filed Sep. 25, 2013, entitled "METHOD, APPARATUS AND COMPUTER PROGRAM FOR WIRELESS COMMUNICATIONS" which is hereby incorporated by reference in its entirety.

This application makes reference to PCT Application number PCT/EP2013/069961 filed on 25 Sep. 2013. The above stated application is hereby incorporated herein by reference in its entirety.

This disclosure relates to interference in communication systems, and more particularly but not exclusively to the measurement, reporting and handling of interference in communication systems.

A wireless communication system can be seen as a facility that enables wireless carriers between two or more nodes such as fixed or mobile communication devices, access points such as base stations, servers and so on. A communication system and compatible communicating devices typically operate in accordance with a given standard or specification which sets out what the various entities associated with the system are permitted to do and how that should be achieved. For example, the standards, specifications and related protocols can define the manner how and what communication devices shall communicate, how various aspects of the communications shall be implemented and how the devices shall be configured. Examples of wireless systems include public land mobile networks (PLMN) such as cellular networks, satellite based communication systems and different wireless local networks, for example wireless local area networks (WLAN). Wireless systems can be divided into coverage areas referred to as cells. Different types of cells can provide different features. For example, cells can have different shapes, sizes, power levels and other characteristics. FIG. 1 shows a schematic example of a system comprising two base stations and two devices in communication with the base stations.

A user can access the communication system by means of an appropriate communication device. A communication device of a user is often referred to as user equipment (UE) or terminal. A communication device is provided with an appropriate signal receiving and transmitting arrangement for enabling communications with other parties. Wireless systems enable mobility for users where a mobile device can communicate over an air interface with another communication device such as e.g. a base station and/or other user equipment.

Examples of mobile communication systems are those based on standards by the 3rd Generation Partnership Project (3GPP). A recent 3GPP development is often referred to as the long-term evolution (LTE) of the Universal Mobile Telecommunications System (UMTS) radio-access technology. The various development stages of the 3GPP LTE specifications are referred to as releases. In LTE base stations are commonly referred to as enhanced NodeBs (eNB).

LTE provides frequency division duplex (FDD) and time division duplex (TDD) modes for wireless communications. The FDD mode uses a paired spectrum where the frequency domain is used to separate the uplink (UL) and downlink (DL) transmission. In TDD systems, an unpaired spectrum may be used where both UL and DL are transmitted over the same carrier frequency. The UL and DL are separated in the time domain. In LTE TDD physical layer the uplink and downlink are divided into 10 ms long radio frames. FIG. 2 illustrates an exemplary radio frame structure 20 for LTE time division duplex (TDD). A LTE TDD radio frame is divided into timeslots where two consecutive slots form one subframe. Thus each frame can be understood as being divided into ten 1 ms subframes #0-#9. Within a radio frame, a node following the LTE TDD standard can switch multiple times between downlink and uplink transmission and vice versa. The exact switching pattern depends on the applied UL-DL configuration. However, uplink (UL) transmission may interfere with the downlink (DL) and vice versa. An example for UL-DL interference is shown in FIG. 1 (note that carriers C1 and C2 can comprise a single carrier). Such interference can be an important limiting factor to flexible UL-DL allocation. Critical control information, non-limiting examples of which include one or more of primary/secondary synchronization signal (PSS/SSS), physical broadcast channel (PBCH), system information, paging information, and random access channel (RACH) response message transmitted over Physical Downlink Shared Channel (PDSCH) with DL grant on Physical Downlink Control Channel (PDCCH) or Enhanced PDCCH (EPDCCH), Cell-specific reference signal (CRS) and/or channel state information reference signal (CSI-RS), UL control information transmitted on Physical Uplink Control Channel (PUCCH)/Physical Uplink Shared Channel (PUSCH) and dynamic broadcast channel (BCH) carrying system information blocks (SIBs) can become exposed to severe interference if one or more neighbouring cells is/are in opposite direction in the same subframe.

In general, loss of critical control information may even prevent the whole system from working. To ensure reliability control information should be communicated in a time period when neighbouring cells have the same UL-DL direction. This is known as a protected time period.

Communication in radio frames can be switched between uplink and downlink subframes. Switching from the downlink to the uplink can be provided on a subframe commonly referred to as a special subframe, denoted by "S" in FIG. 2. A special subframe comprises Downlink Pilot Timeslot (DwPTS) 22 and Uplink Pilot Timeslot (UpPTS) fields 24. A guard period (GP) 23 is provided between the downlink and uplink pilots.

In a first aspect there is provided a method comprising: measuring co-channel interference and cross-channel interference at an apparatus; and providing, to a node, information regarding said co-channel interference and said cross-channel interference.

Preferably said information is comprised in a channel state information message.

Preferably said method comprises providing an average cross-channel interference value for a plurality of interferers in said channel state information message.

Preferably said method comprises providing a separate channel state information message for at least one dominant interferer.

Preferably said information comprises an identity of at least one interferer.

Preferably said identity comprises at least one of: user equipment identity; access point identity; interference sequence identity.

Preferably said method comprises providing an absolute level of interference.

Preferably said method comprises providing a relative level of interference.

Preferably said method comprises receiving configuration information from said node for configuring said measuring and providing.

Preferably said apparatus comprises a user equipment.

In a second aspect there is provided a computer program comprising computer executable instructions which when run on one or more processors perform the method of the first aspect.

In a third aspect there is provided an apparatus comprising: at least one processor;
and at least one memory including computer program code; the at least one memory and the computer program code configured to, with the at least one processor, cause the apparatus at least to: measure co-channel interference and cross-channel interference; and provide, to a node, information regarding said co-channel interference and said cross-channel interference.

Preferably said apparatus is configured to provide said information in a channel state information message.

Preferably said apparatus is configured to provide an average cross-channel interference value for a plurality of interferers in said channel state information message.

Preferably said apparatus is configured to provide a separate channel state information message for at least one dominant interferer.

Preferably said information comprises an identity of at least one interferer.

Preferably said identity comprises at least one of: user equipment identity; access point identity; interference sequence identity.

Preferably said apparatus is configured to provide an absolute level of interference.

Preferably said apparatus is configured to provide a relative level of interference.

Preferably said apparatus is configured to receive configuration information from said node for configuring said measuring and providing.

Preferably said apparatus comprises a user equipment.

In a fourth aspect there is provided an apparatus comprising means for measuring co-channel interference and cross-channel interference; and means for providing, to a node, information regarding said co-channel interference and said cross-channel interference.

Preferably said apparatus is configured to provide said information in a channel state information message.

Preferably said apparatus is configured to provide an average cross-channel interference value for a plurality of interferers in said channel state information message.

Preferably said apparatus is configured to provide a separate channel state information message for at least one dominant interferer.

Preferably said information comprises an identity of at least one interferer.

Preferably said identity comprises at least one of: user equipment identity; access point identity; interference sequence identity.

Preferably said apparatus is configured to provide an absolute level of interference.

Preferably said apparatus is configured to provide a relative level of interference.

Preferably said apparatus comprises means for receiving configuration information from said node for configuring said measuring and providing.

Preferably said apparatus comprises a user equipment.

In a fifth aspect there is provided a method comprising: receiving, at an apparatus, cross-channel interference information and co-channel interference information for at least one user equipment; and using said information for scheduling transmissions for a set of user equipment.

Preferably said information is comprised in a channel state information message.

Preferably said method comprises receiving an average cross-channel interference value for a plurality of interferers in said channel state information message.

Preferably said method comprises receiving a separate channel state information message for each dominant interferer.

Preferably said information comprises an identity of at least one interferer.

Preferably said identity comprises at least one of: user equipment identity; access point identity; interference sequence identity.

Preferably said method comprises receiving at least one of: an indication of an absolute level of interference; an indication of a relative level of interference.

Preferably said scheduling comprises scheduling transmit and receive periods of each user equipment in said set of user equipment.

Preferably said scheduling comprises scheduling of a physical downlink shared channel.

Preferably said method comprises providing configuration information to said at least one user equipment.

Preferably said apparatus comprises one of an access point and a base station.

In a sixth aspect there is provided a computer program comprising computer executable instructions which when run on one or more processors perform the method of the fifth aspect.

In a seventh aspect there is provided an apparatus comprising: at least one processor; and at least one memory including computer program code; the at least one memory and the computer program code configured to, with the at least one processor, cause the apparatus at least to: receive cross-channel interference information and co-channel interference information for at least one user equipment;
and use said information for scheduling transmissions for a set of user equipment.

Preferably said information is comprised in a channel state information message.

Preferably said apparatus is configured to receive an average cross-channel interference value for a plurality of interferers in said channel state information message.

Preferably said apparatus is configured to receive a separate channel state information message for each dominant interferer.

Preferably said information comprises an identity of at least one interferer.

Preferably said identity comprises at least one of: user equipment identity; access point identity; interference sequence identity.

Preferably said apparatus is configured to receive at least one of: an indication of an absolute level of interference; an indication of a relative level of interference.

Preferably said scheduling comprises scheduling transmit and receive periods of each user equipment in said set of user equipment.

Preferably said scheduling comprises scheduling of a physical downlink shared channel.

Preferably said apparatus is configured to provide configuration information to said at least one user equipment.

Preferably said apparatus comprises one of an access point and a base station.

In an eighth aspect there is provided an apparatus comprising means for receiving cross-channel interference information and co-channel interference information for at least one user equipment; and means for using said information for scheduling transmissions for a set of user equipment.

Preferably said information is comprised in a channel state information message.

Preferably said apparatus is configured to receive an average cross-channel interference value for a plurality of interferers in said channel state information message.

Preferably said apparatus is configured to receive a separate channel state information message for each dominant interferer.

Preferably said information comprises an identity of at least one interferer.

Preferably said identity comprises at least one of: user equipment identity; access point identity; interference sequence identity.

Preferably said apparatus is configured to receive at least one of: an indication of an absolute level of interference; an indication of a relative level of interference.

Preferably said scheduling comprises scheduling transmit and receive periods of each user equipment in said set of user equipment.

Preferably said scheduling comprises scheduling of a physical downlink shared channel.

Preferably said apparatus is configured to provide configuration information to said at least one user equipment.

Preferably said apparatus comprises one of an access point and a base station.

In a ninth aspect there is provided a method comprising: receiving, at an apparatus, configuration information for configuring interference measurement and reporting by said apparatus; measuring interference at said apparatus in accordance with said configuration information; and reporting said measured interference at a time in accordance with said configuration information.

Preferably said configuration information causes said apparatus to measure and report co-channel and cross-channel interference.

In a tenth aspect there is provided computer program comprising computer executable instructions which when run on one or more processors perform the method of the ninth aspect.

In an eleventh aspect there is provided an apparatus comprising: at least one processor; and at least one memory including computer program code; the at least one memory and the computer program code configured to, with the at least one processor, cause the apparatus at least to: receive configuration information for configuring interference measurement and reporting by said apparatus; measure interference at said apparatus in accordance with said configuration information; and report said measured interference at a time in accordance with said configuration information.

Preferably said configuration information causes said apparatus to measure and report co-channel and cross-channel interference.

In a twelfth aspect there is provided an apparatus comprising means for receiving configuration information for configuring interference measurement and reporting by said apparatus; means for measuring interference at said apparatus in accordance with said configuration information; and means for reporting said measured interference at a time in accordance with said configuration information.

Preferably said configuration information causes said apparatus to measure and report co-channel and cross-channel interference.

In a thirteenth aspect there is provided a method comprising: sending, from an apparatus to at least one user equipment, configuration information for configuring interference measurement and reporting by said at least one user equipment; and receiving at said apparatus interference information from said at least one user equipment at a time in accordance with said configuration information.

Preferably said configuration information causes said at least one user equipment to measure and report co-channel and cross-channel interference.

In a fourteenth aspect there is provided a computer program comprising computer executable instructions which when run on one or more processors perform the method of the thirteenth aspect.

In a fifteenth aspect there is provided an apparatus comprising: at least one processor; and at least one memory including computer program code; the at least one memory and the computer program code configured to, with the at least one processor, cause the apparatus at least to: send, to at least one user equipment, configuration information for configuring interference measurement and reporting by said at least one user equipment; and receive interference information from said at least one user equipment at a time in accordance with said configuration information.

Preferably said configuration information causes said at least one user equipment to measure and report co-channel and cross-channel interference.

In a sixteenth aspect there is provided means for sending, to at least one user equipment, configuration information for configuring interference measurement and reporting by said at least one user equipment; and means for receiving interference information from said at least one user equipment at a time in accordance with said configuration information.

Preferably said configuration information causes said at least one user equipment to measure and report co-channel and cross-channel interference.

Embodiments will now be described, by way of example only, with reference to the accompanying Figures in which.

Figure 10:
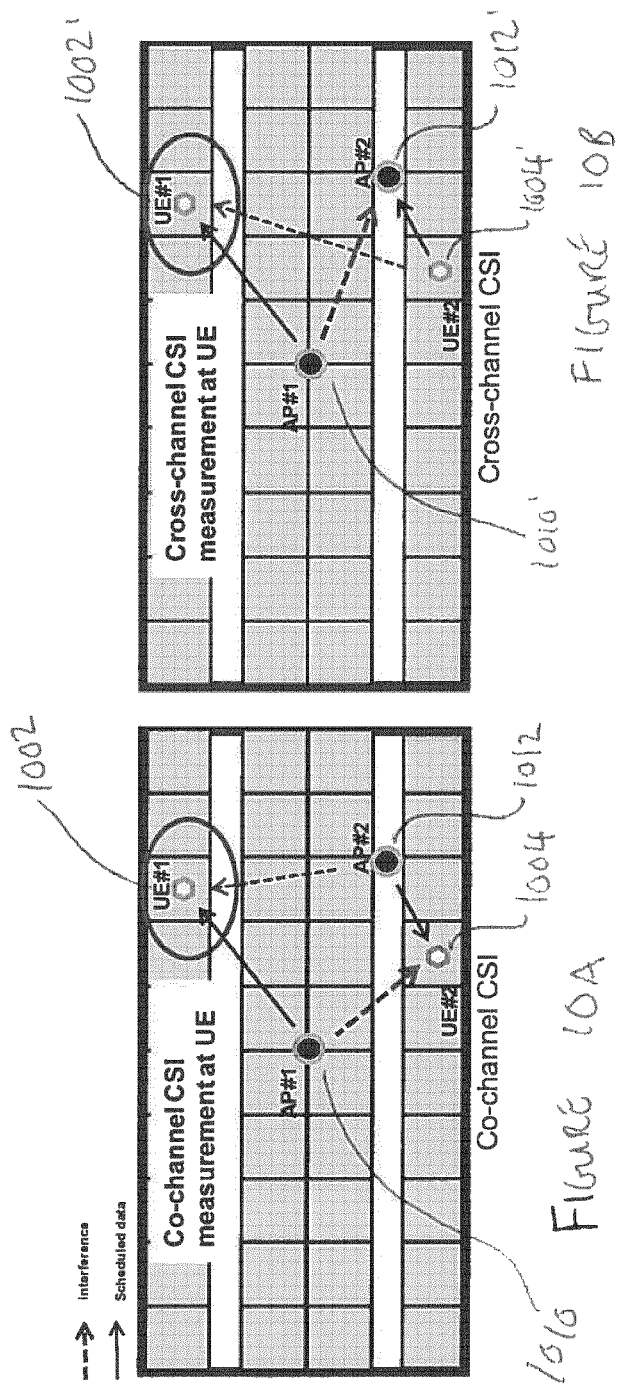

FIGS. 10A and 10B respectively show interference scenarios for co-channel and cross-channel CSI;

FIG. 11 shows a selection of candidate scheduling allocations.

In the following certain exemplifying embodiments are explained with reference to a wireless or mobile communication system serving mobile communication devices. Before explaining in detail the exemplifying embodiments, certain general principles of wireless communications are briefly explained with reference to FIGS. 1 to 3 to assist in understanding the technology underlying the described examples.

A non-limiting example of the recent developments in communication system architectures is the long-term evolution (LTE) of the Universal Mobile Telecommunications System (UMTS) standardized by the 3rd Generation Partnership Project (3GPP). More recent development of the LTE, Release 10 and upwards, are sometimes referred to as LTE-Advanced. The LTE employs a mobile architecture known as the Evolved Universal Terrestrial Radio Access Network (E-UTRAN). Base stations of such systems are known as evolved or enhanced Node Bs (eNBs) and may provide E-UTRAN features such as user plane Radio Link Control/Medium Access Control/Physical layer protocol (RLC/MAC/PHY) and control plane Radio Resource Control (RRC) protocol terminations towards the communication devices. Other examples of radio access system include those provided by base stations of systems that are based on technologies such as wireless local area network (WLAN) and/or WiMax (Worldwide Interoperability for Microwave Access).

Figure 1:
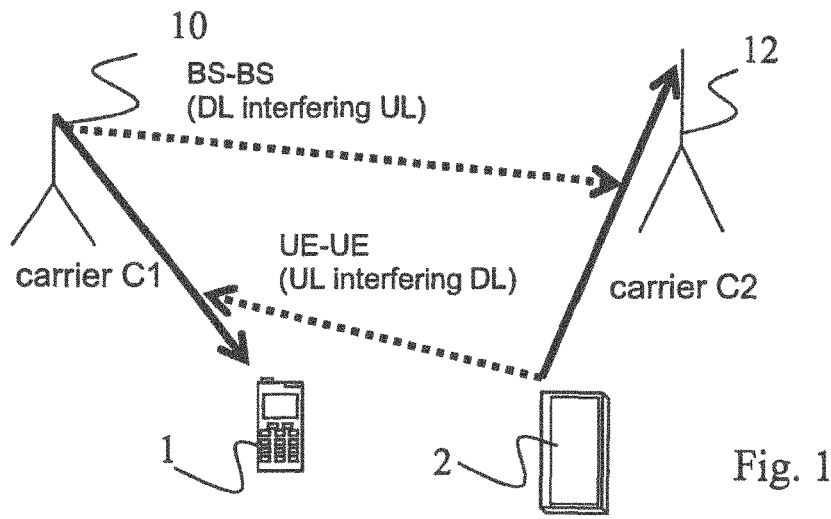
FIG. 1 shows a schematic diagram of a communication system where the invention may be embodied.

Mobile communication devices 1 and 2 can be provided with wireless access via base stations or similar wireless transmitter and/or receiver nodes providing radio service areas or cells. The base stations are typically connected to a wider communications network via appropriate gateways. FIG. 1 shows two base stations 10 and 12. A mobile communication device may be located in the service areas of different cells, communicate with more than one cell and be handed over from a cell to another. The base station nodes can be connected to a core communications network via appropriate gateways and/or backhaul systems. It is noted that the base stations and mobile devices are only schematically shown for illustration purposes in FIG. 1, and that the number and type of these can vary considerably from that shown. It should also be appreciated that carrier C1 and carrier C2 may not be related to carrier frequencies. Rather, they may represent an instantaneous traffic situation in a TDD deployment i.e. carriers C1 and C2 may be operating on the same carrier and using overlapping frequency and time resources.

Base stations are typically controlled by at least one appropriate controller apparatus so as to enable operation thereof and management of mobile communication devices in communication with the base stations. The control apparatus can be interconnected with other control entities.

Figure 3:
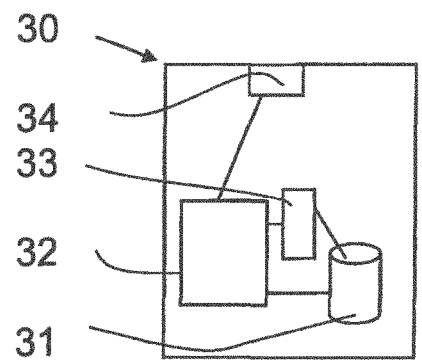
FIG. 3 shows a schematic diagram of a control apparatus according to some embodiments.

FIG. 3 shows an example of a control apparatus capable of operating in accordance with the embodiments, for example to be coupled to and/or for controlling a base station or any other access point (AP). The control apparatus 30 can be arranged to provide control on communications in the service area of a cell. In some embodiments a base station can comprise a separate control apparatus. In other embodiments the control apparatus can be another network element. The control apparatus 30 can be configured to provide control functions in association with generation and communication of radio frames and necessary information for enabling flexible switching and/or allocation of radio resources for communications between the base station and mobile devices. The control functions are provided by means of a data processing facility in accordance with certain embodiments described below. For this purpose the control apparatus can comprise at least one memory 31, at least one data processing unit 32, 33 and an input/output interface 34. The control apparatus can be coupled to a receiver and/or transmitter of the base station via the interface. The control apparatus can be configured to execute an appropriate software code to provide the control functions. The control apparatus and functions may be distributed between a plurality of control units. In some embodiments, each base station can comprise a control apparatus. In alternative embodiments, two or more base stations may share a control apparatus.

A possible mobile device for communications with the base stations is often referred to as user equipment (UE) or terminal. An appropriate mobile device may be provided by any device capable of sending radio signals to and/or receiving radio signals from multiple cells. Non-limiting examples include a mobile station (MS) such as a mobile phone or what is known as a 'smart phone', a portable computer provided with a wireless interface card or other wireless interface facility, personal data assistant (PDA) provided with wireless communication capabilities, or any combinations of these or the like. A mobile device may provide, for example, communication of data for carrying communications such as voice, electronic mail (email), text message, multimedia and so on. Users may thus be offered and provided numerous services via their devices. Non-limiting examples of these services include two-way or multi-way calls, data communication or multimedia services or simply an access to a data communications network system, such as the Internet. Users may also be provided broadcast or multicast data. Non-limiting examples of the content include downloads, television and radio programs, videos, advertisements, various alerts and other information. The mobile device may receive and transmit signals over an air interface with multiple base stations via an appropriate transceiver apparatus.

Figure 2:
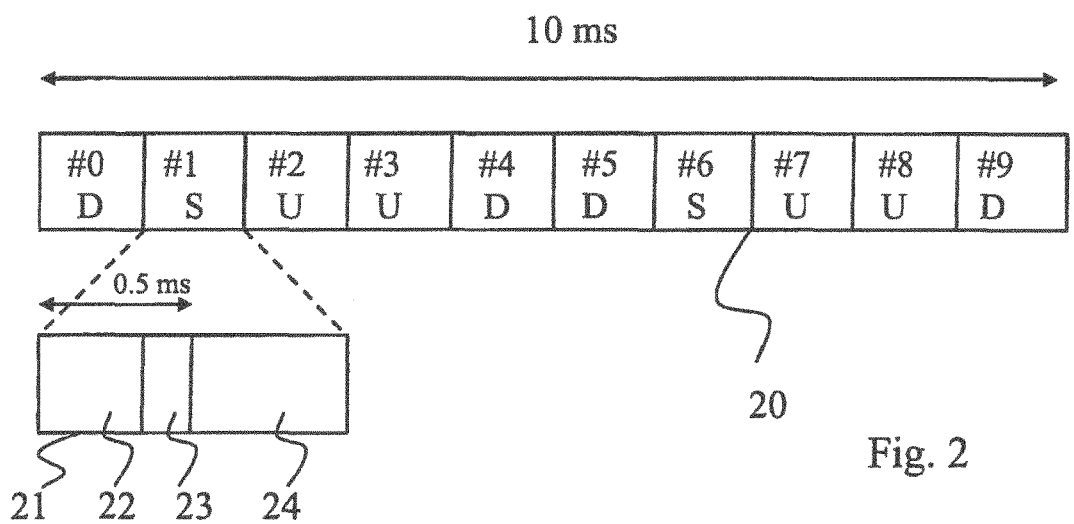
FIG. 2 shows a radio frame.
Figure 4:
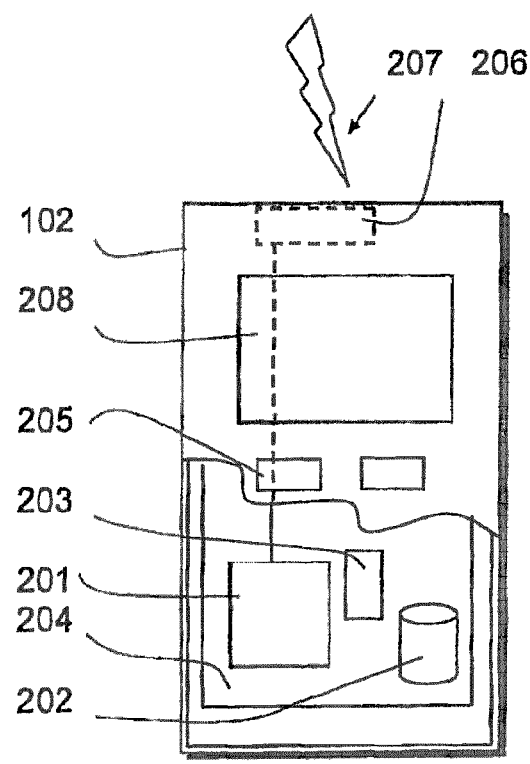
FIG. 4 shows a schematic diagram of a user equipment according to some embodiments.

A possible mobile communication device for transmitting and retransmitting information blocks towards the stations of the system will now be described in more detail in reference to FIG. 4 showing a schematic, partially sectioned view of a communication device 102. The mobile device 102 may receive signals over an air interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

A mobile device is also typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chip-sets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

A wireless communication device, such as a base station and/or a mobile station, can be provided with a Multiple Input/Multiple Output (MIMO) antenna system for enabling multi-flow communications. MIMO arrangements as such are known. MIMO systems use multiple antennas at the transmitter and receiver along with advanced digital signal processing to improve link quality and capacity. More data can be received and/or sent where there are more antenna elements.

FIG. 2 illustrates a radio frame structure 20 for LTE time division duplex (TDD). In this example the switching between the subframes follows existing LTE UL-DL configuration 1 (seven different configurations have been defined in current LTE TDD). In LTE TDD physical layer one radio frame is divided into 10 subframes. A LTE TDD radio frame is further divided into 0.5 ms timeslots, two consecutive slots forming one subframe. Thus each frame 20 is divided into ten 1 ms subframes #0-#9. Each frame can comprise at least one subframe 21 containing special fields known as downlink pilot time slot (DwPTS) 22, guard period (GP) 23 and uplink pilot time slot (UpPTS) 24. Such a subframe is commonly referred to as a special subframe. The special subframes of frame 20 are located at subframes #1 and #6 and are denoted by S. The special subframe has been defined for example in LTE Release 8. According to LTE specifications the fields of a special subframe can have nine different configurations. The lengths of the individual fields 22, 23 and 24 in a special subframe can depend on the uplink/downlink configuration selected by the network. The total length of the three fields in a LTE special frame remains constant at 1 ms.

A process known as timing advance is provided to prevent conflicts when switching from the uplink to the downlink transmission. When switching from the downlink to the uplink, a guard period (GP) 23 is inserted between Downlink Pilot Timeslot (DwPTS) 22 and Uplink Pilot Timeslot (UpPTS) 24 fields. The duration of the GP 23 can depend on various factors, for example the signal propagation time from a base station to mobile device and back as well as on the time the mobile device requires to switch from receiving to sending.

A local area system may comprise one or more access points (APs) and one or more user equipment (UE). A local area system can be deployed either in a standalone or centrally coordinated manner. In a standalone local area system all APs in the network operate independently with respect to each other.

Figure 5:
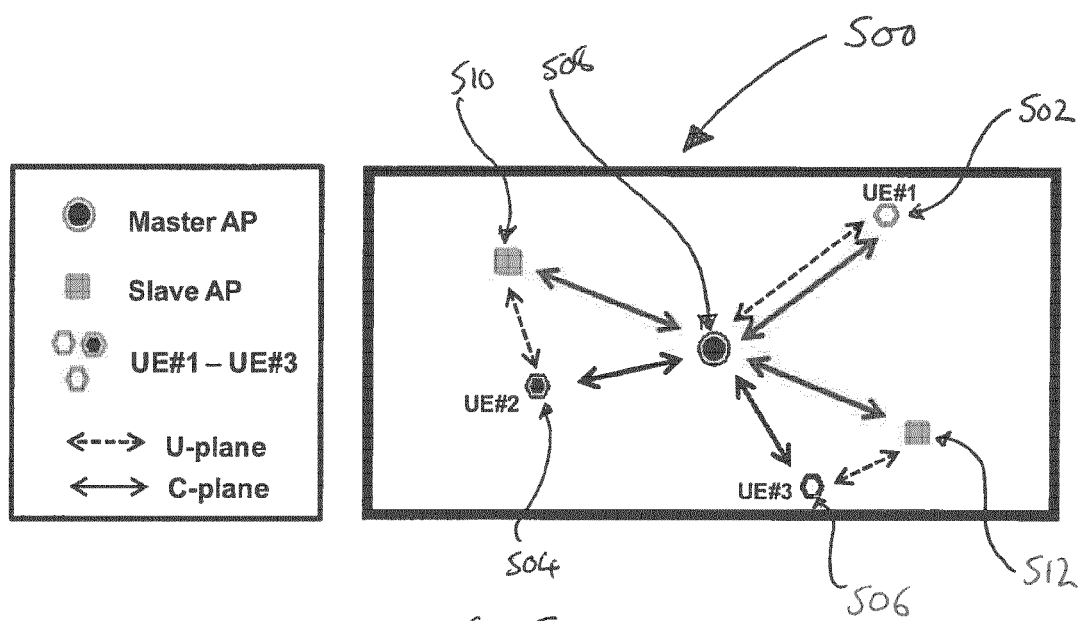
FIG. 5 shows certain parts of a communication system illustrating a coordinated local area network.

FIG. 5 shows an example of a coordinated local area system 500 comprising UEs 502, 504 and 506. The co-ordinated local area system also comprises a master AP 508 and slave APs 510 and 512. The user plane connections are denoted by the dashed bi-directional arrows, and the control plane connections are denoted by the solid bi-directional arrows.

In a centralised (or coordinated) local area deployment the APs may be coordinated by a wireless controller. The controller communicates with APs providing a scalable centralised control plane to the wireless network. The controller functionality may be physically located in one of the existing APs.

Referring to FIG. 5 the controlling of the APs takes place over the air and both slave APs 510 and 512, and the UEs 502, 504 and 506 connected to the slave APs are able to receive (or transmit) scheduling information transmitted from (or received by) master AP 508.

Some embodiments relate to 5G local area radio systems which are expected to be commercially available around 2020. Some embodiments may however also be introduced in an evolution of LTE.

Figure 6:
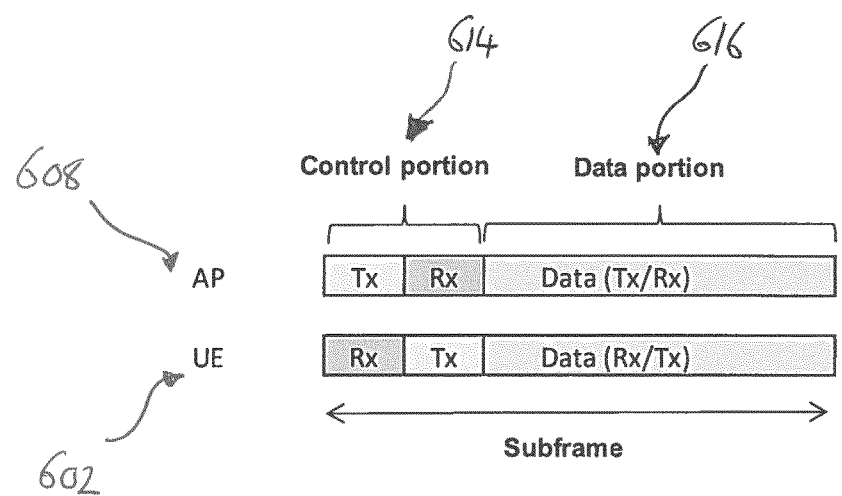
FIG. 6 illustrates a TDD frame structure.

An exemplary TDD frame structure for 5G local area radio is shown in FIG. 6. FIG. 6 shows the frame structure for an AP 608 and a UE 602. Each subframe comprises a control portion 614 and a data portion 616. It can be seen that in the control portion 614 the access point is configured to transmit in a time period where the UE 602 is configured to receive, and that the AP 608 is configured to receive in a time period where the UE is configured to transmit. The data portion 616 is a mixture of transmit and receive periods for the APs 608 and the UE 602.

That is each subframe contains bi-directional control and one-directional data portions. In other words in the data portion 616 one of the access point 608 and the UE 602 is configured to transmit, when the other of the access points 608 and the UE 602 is configured to receive. When AP 608 is transmitting the data portion the UE 602 is receiving it and vice versa. This may alternate between subframes. The scheduling node allocates the entire data portion either for downlink or uplink. This frame structure may provide unlimited capability for traffic adaptation between uplink and downlink with the granularity of one subframe.

It should be noted that for simplicity in FIG. 6 the guard periods between Tx and Rx phases are not shown Communication systems comprising APs and UEs in communication may suffer from one or more of co-channel interference and cross-link interference. In co-channel interference a downlink stream may interfere with another downlink stream, or an uplink stream may interfere with another uplink stream. In cross-link interference a downlink stream may interfere with an uplink stream, and an uplink stream may interfere with a downlink stream.

The so called cross-link interference may be a potential problem in TDD systems using flexible UL/DL adaptation.

Figure 7:
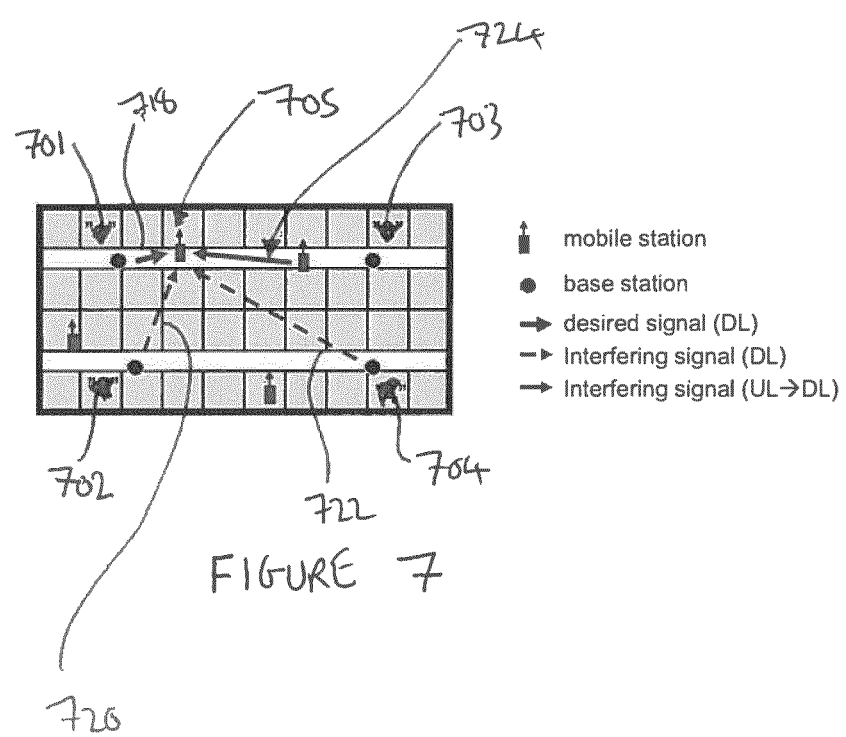
FIG. 7 shows certain parts of a communication system illustrating cross-link interference.

FIG. 7 shows a snapshot (e.g. a subframe) in a case where three cells 701, 702 and 704 are in a downlink phase with respect to UE 705. The signal represented by arrow 718 may be considered the "desired" signal, and the signals represented by arrows 720 and 722 may be considered interfering downlink signals.

Cell 703 is, on the other hand, in an uplink phase. An interfering uplink signal is represented by arrow 724. Accordingly cell 703 may be considered a problem since the interfering transmitter is located in close proximity with the desired user 705.

As discussed above, in the 5G scenario the scheduling or master AP may have full freedom to coordinate link direction (i.e. uplink or downlink) separately for each cell. This may provide an additional degree of freedom for multi-user multiple input multiple output MU-MIMO/coordinated beam forming. This may provide a reduction in the interference levels (for example considering the scenario depicted in FIG. 7) if the link direction for each interfering cell is jointly selected as part of a centralised frequency domain/MIMO scheduling. This could result in considerable system level gain.

To provide support for dynamic/cell-specific link direction selection as part of coordinated MU-MIMO/coordinated beamforming in an area consisting of multiple cells or transmission and reception points (e.g. APs and UEs), it has been identified by the present inventors that there is required sufficient means or provisions for the coordinating (master) AP to obtain up-to-date channel state information (CSI) corresponding to interference scenarios behind different scheduler decisions. In other words there has been identified a requirement to provide sufficient channel state information for the central node (e.g. master AP) to coordinate scheduling.

Figure 8:
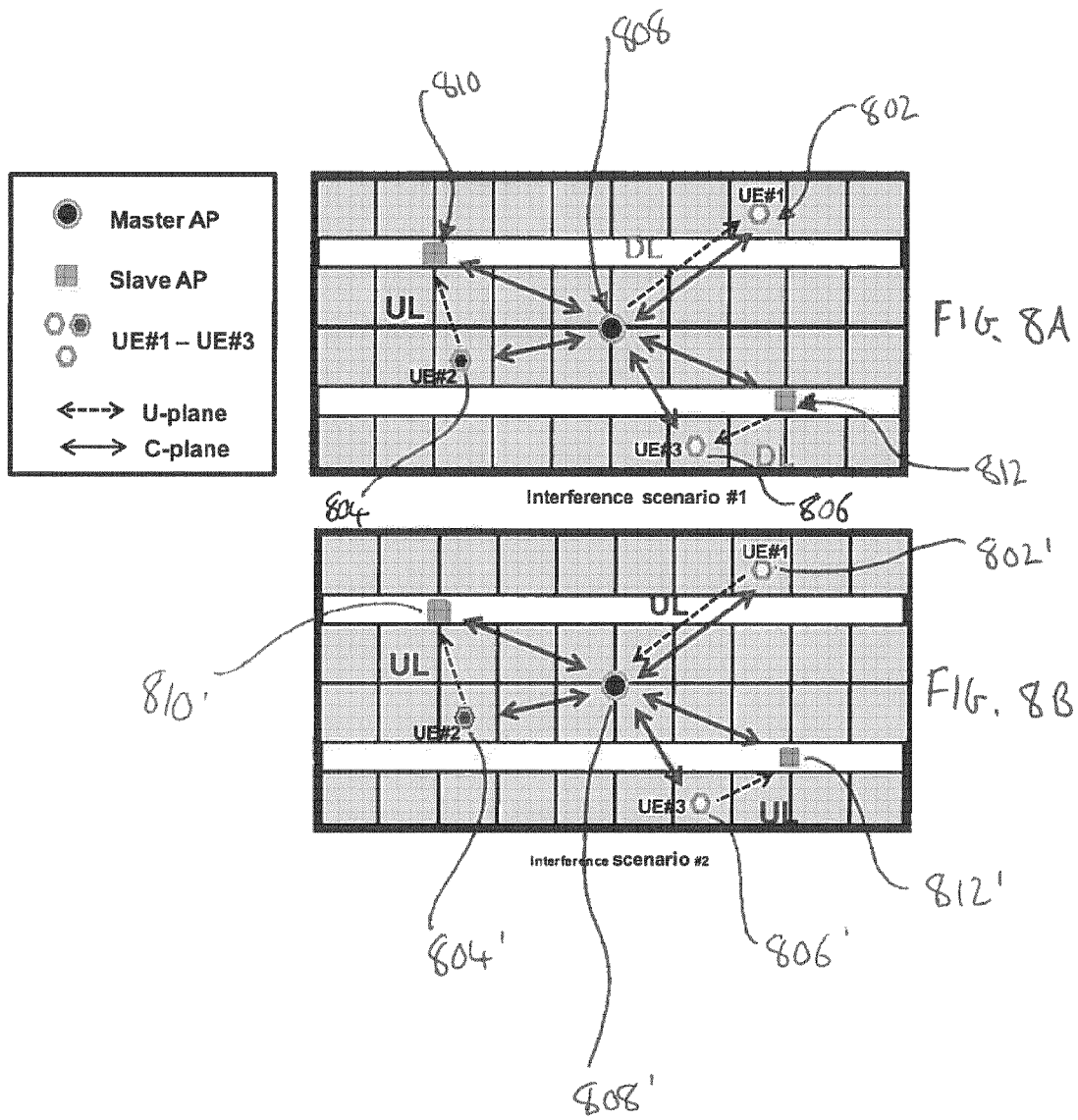
FIGS. 8A and 8B show separate interference scenarios.

The need for providing sufficient channel state information for coordinated scheduling can be appreciated by viewing FIGS. 8A and 8B which show two (out of eight) interference scenarios which could take place in a scenario with 3 UEs and 3 APs. It will be appreciated that FIGS. 8A and 8B are simplified and that in practice the scenario may be more complicated consisting of more APs, more UEs, frequency domain packet scheduling (FDPS), MIMO, different location of UEs and APs etc.

In FIG. 8A the UEs 802, 804 and 806 are in communication with a master access point 808. The system also comprises slave APs 810 and 812. User plane communications are represented by the dotted arrows, and the control plane communications are represented by the solid arrows.

In FIG. 8A there is downlink data transfer between master AP 808 and UE 802, and downlink data transfer from slave AP 812 to UE 806. There is uplink data transfer from UE 804 to slave AP 810. It will therefore be appreciated that there is potential for co-channel interference between the downlink data, and cross link interference between the uplink channels and the downlink channels.

FIG. 8B shows a similar scenario involving the same entities. However in FIG. 8B the UE 806' is transferring data on the uplink to the slave AP 812', and the UE 802' is transferring data on the uplink to master AP 809'. That is all UEs are transferring data on the uplink, thus increasing the potential for co-channel interference.

In view of the above, some embodiments provide a channel state information (CSI) arrangement to support dynamic and cell-specific link direction (i.e. uplink or downlink) selection as part of a coordinated MU-MIMO/coordinated beam forming in an area consisting of multiple cells or Tx/Rx points. The embodiments may cover both the arrangement and preparation of the CSI message (and the carrying out of the measurements necessary to prepare the CSI), the transmission and reception of the CSI message, as well as the reading and interpretation of the CSI message at a receiver thereof.

The AP may send configuration information to the one or more user equipment. This configuration information can be used by the one or more user equipment to configure how the user equipment is to measure the interference and/or report the interference measurements. The configuration information may comprise information, for example timing information, which can be used by the user equipment to determine when to report the interference measurements. Accordingly the reporting of the interference measurements (for example in a CSI) can be co-ordinated between a plurality of user equipment such that the reports are received at the AP at a time in accordance with the configuration information. Accordingly the AP can efficiently process the information.

The proposed CSI arrangement may contain the following elements:
  Co-channel CSI. This corresponds to a legacy CSI operation. In some embodiments when the UE measures the co-channel CSI, the interfering cell or cells are in a downlink phase.
  Cross-channel CSI. When a UE measures the cross-channel CSI, the interfering cells or nodes to be measured are in an uplink phase or in device to device (D2D) mode. In other words the UE may be measuring UE to UE interference and/or path gain.

It is to be noted that the term CSI may comprise any type of channel state information, for example channel quality information (CQI), precoder matrix indicator (PMI), and rank indicator (RI). Accordingly the approach for CSI reporting would therefore apply to these types of channel state information also (i.e. CQI, PMI and IR).

In embodiments the CSI can be either frequency selective or wideband (i.e. frequency flat).

In order to measure cross-channel CSI, Tx/Rx phases among UEs need to be coordinated in order to support half duplex operation. That is all UEs may be co-ordinated to transmit data and/or control signals (e.g. reference signals) at the same time, and to receive data and/or control signals (e.g. reference signals) at the same time. Accordingly in some embodiments predetermined discovery patterns may be used to enable bidirectional Tx/Rx for the signal used to aid CSI measurements, such as a predetermined reference signal.

In the context of some embodiments, the term CSI should be understood as a generic term representing a message used to convey the measured information related to a radio channel. In other embodiments, the CSI could be providing information such as signal-to-interference and noise ratio (SINR), carrier-to-interference ratio (C/I), signal-to-noise ratio (SNR), etc. The CSI may or may not contain frequency selective information. It may also contain MIMO specific information such as rank and precoding information. The measurement may be carried out separately for the desired signal part and interference part. The interference measurement may also involve setting the transmission power of certain reference signals or resource elements to be zero (such that the desired signal is not present in the measurement).

Furthermore, additional support for "scheduled cross-channel CSI" measurement and reporting may be provided. According to such a scheme the scheduling AP (master AP) may transmit a specific scheduling grant or grant(s) towards involved nodes (i.e. slave APs and/or UEs). This grant or grant(s) can:
(1) trigger coordinated transmission of proper (reference) signal at the transmitting node;
(2) trigger related cross-link CSI measurements at involved node(s); and
(3) report the measured CSI by a predetermined channel towards a predetermined master/slave AP.

In embodiments there are different ways available to define the cross channel CSI which is reported to the AP. That is the CSI may comprise:
  "Average CSI" combining cross channel interference for all active UEs
  A separate CSI for each dominant interferer
  A separate CSI report for N dominant interferers (where N is equal to or greater than one)

The CSI reports for each dominant interferer may also contain one or more of the following: identification of the interferer (either through UE ID, AP ID, interference sequence ID or other means that provide direct or indirect (indicative) identification; an absolute level of interference; a relative level of interference (for instance relative to the CSI reported towards the serving AP).

Figure 9:
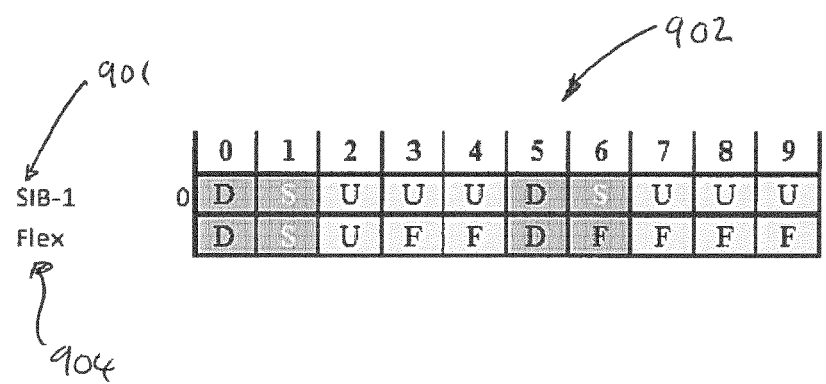
FIG. 9 shows a radio frame structure.

FIG. 9 illustrates a basic eIMTA (Enhanced Interference Management and Traffic Adaptation) setting as disclosed in Rel-12 work item eIMTA—"Further enhancements to LTE TDD for DL-UL Interference Management and Traffic Adaptation". In FIG. 9 TDD configuration zero is shown as an example, but the same principle may apply to other configurations as well. In addition to the SIB-1 configured UL-DL configuration shown at 901, which defines whether a given subframe (0 to 9) in the radio frame 902 is a downlink, special, or uplink subframe, in the case of flexible TDD UL-DL configurations. That is some of the uplink subframes can be changed into downlink subframes.

Therefore in the flexible configuration 904 a number of subframes denoted "F" may be either uplink or downlink subframes.

In terms of CSI reporting, it has been suggested to have at least two subframe sets that can be configured to allow separate CSI measurement/reporting for either of two types of subframe (i.e. fixed and flexible as shown in FIG. 9), and/or two types of interference seen by a subframe.

However there are drawbacks with the eIMTA proposal, meaning that it may not be suitable for all present or future scenarios. First, the scheduling considered in Rel-12 eIMTA relates to a single cell only. Furthermore, CSI related to flexible subframes contains both co-channel and cross-linked interference. Accordingly, the Rel-12 eIMTA reporting being developed cannot be used in dynamic/cell specific link direction selection as part of coordinated MU-MIMO/coordinated beamforming. Rather, its purpose is just to support link adaptation for flexible subframes.

FIGS. 10A & 10B respectively show deployments in which a co-channel CSI measurement is taken at a UE and a cross channel CSI measurement is taken at a UE, according to some embodiments.

Referring to FIG. 10A a first UE 1002 is in communication with a first access point 1010 and a second access point 1012. A second UE 1004 is also in communication with access points 1010 and 1012. The scheduled data is represented by the solid arrows, and the interference is represented by the dashed arrows.

From the perspective of UE 1002 it is receiving scheduled data from AP 1010, and interference from AP 1012. Since both the scheduled data and interference data is on the same link direction (one of uplink and downlink) then the UE 1002 is measuring co-channel CSI.

Referring to FIG. 10B, the UE 1002' is receiving scheduled data from AP 1010', and is receiving interference from UE 1004'. Therefore in FIG. 10B, from the perspective of UE 1002', the scheduled data and interference is on different link directions. Accordingly in FIG. 10B the UE 1002' is measuring cross-channel CSI.

According to embodiments the scheduling (master) AP or eNB/AP utilises co-channel/cross channel CSI for:
(1) dynamic and cell specific link direction selection as part of a coordinated MU-MIMO/coordinated beam forming; and
(2) link/rank adaptation when scheduling PDSCH (physical downlink shared channel).

An example of coordinated scheduling involving dynamic and cell-specific link direction selection is shown in FIG. 11.

This shows three candidates frame allocations which may be selected by a master access point for scheduling of cells A to C. It will of course be appreciated that this is by way of example only, and that more or fewer cells, and more or fewer candidates frame allocations may be available. The uplink subframes are shaded, and the downlink subframes are unshaded.

Referring to "candidate 1", in subframe n each of cells A to C is allocated an uplink subframe. In both subframes n+1 and n+2 each of cells A to C is allocated downlink subframes.

Referring to "candidate 2", in subframe n cell A is allocated an uplink subframe, and cells B and C are allocated downlink subframes. In subframe n+1 both cells A and C are allocated downlink subframes, and cell B is allocated an uplink subframe. In subframe n+2 both cells A and B are allocated downlink subframes, and cell C is allocated an uplink subframe.

Referring to "candidate 3", in subframe n cell A is allocated an uplink subframe, and cells B and C are allocated downlink subframes. In subframe n+1 cell A is allocated a downlink subframe, and cells B and C are allocated uplink subframes. In subframe n+2 all of cells A to C are allocated downlink subframes.

The master AP can at any time switch between the available candidate subframe allocations. This could be in response to a trigger, such as receipt of one or more CSIs from the cells. Accordingly it can be appreciated that dynamic and cell specific link direction selection can be made in response to receipt of the CSI at the master AP.

It will also be appreciated from FIG. 11 that in this embodiment one subframe is reserved for UL traffic in each cell, and two subframes are reserved for DL traffic in each cell.

In some embodiments the master AP coordinates the Tx/Rx resources reserved for CSI measurement. Such coordination may be needed to support CSI measurement for half-duplex nodes.

In order to convey the measured CSI to the scheduling entity (such as a master AP), in some embodiments the master AP configures the CSI measurement and reporting. This can be done either directly to the UE or as configurations policies via the slave APs. The master AP may also receive the CSI report directly over the air. It is also possible that the slave AP receives the CSI and conveys it to the master AP e.g. via wired X2 interface or over the air. Accordingly embodiments can be deployed in any CoMP (coordinated multipoint) scenarios, such as wired or wireless backhaul, having ideal (in terms of latency) or non-ideal backhaul between involved nodes, and also for self-backhauling.

Accordingly it will be appreciated that some embodiments may enable dynamic and cell specific link direction selection as part of a coordinated MU-MIMO/coordinated beamforming. Using the interference information it may be possible for the master AP to create a complete interference picture for the network nodes under its control.

Embodiments therefore may provide an improvement of CoMP framework to cover flexible TDD, and embodiments could also provide additional CoMP gain in coordinated LA/TDD deployment scenarios.

An appropriately adapted computer program code product or products may be used for implementing the embodiments, when loaded on an appropriate data processing apparatus, for example for determining geographical boundary based operations and/or other control operations. The program code product for providing the operation may be stored on, provided and embodied by means of an appropriate carrier medium. An appropriate computer program can be embodied on a computer readable record medium. A possibility is to download the program code product via a data network. In general, the various embodiments may be implemented in hardware or special purpose circuits, software, logic or any combination thereof. Embodiments of the inventions may thus be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

It is also noted herein that while the above describes exemplifying embodiments of the invention, there are several variations and modifications which may be made to the disclosed solution without departing from the scope of the present invention.

The invention claimed is:
1. A method comprising:
measuring separately co-channel interference and cross-channel interference at an apparatus to produce a co-channel interference measurement and a cross-channel interference measurement distinct from the co-channel interference measurement; and
providing, to a node, information regarding each of the co-channel interference measurement and the cross-channel interference measurement, the node being con- figured to use the information for scheduling transmissions for the apparatus; and providing a channel state information message for at least one dominant interferer.

2. A method as set forth in claim 1, wherein the method comprises providing an average cross-channel interference value for a plurality of interferers in the channel state information message.

3. A method as set forth in claim 1, wherein the information comprises an identity of at least one interferer.

4. A method as set forth in claim 3, wherein the identity comprises at least one of:
user equipment identity;
access point identity; and
interference sequence identity.

5. A method as set forth in claim 1, wherein the method comprises providing at least one of the following:
an absolute level of interference; and
a relative level of interference.

6. A method as set forth in claim 1, wherein the method comprises:
receiving configuration information from the node for configuring the measuring and providing;
wherein the providing comprises:
providing, to the node at a time in accordance with the configuration information, a first information regarding the co-channel interference measurement and a second information regarding the cross-channel interference measurement.

7. An apparatus comprising:
at least one processor;
and at least one memory including computer program code;
the at least one memory and the computer program code configured to, with the at least one processor, cause the apparatus at least to:
measure separately co-channel interference and cross-channel interference to produce a co-channel interference measurement and a cross-channel interference measurement distinct from the co-channel interference measurement;
provide, to a node, information regarding each of the co-channel interference measurement and the cross-channel interference measurement, the node being configured to use the information for scheduling transmissions for the apparatus; and
provide a channel state information message for at least one dominant interferer.

8. An apparatus as set forth in claim 7, wherein the apparatus is configured to provide an average cross-channel interference value for a plurality of interferers in the channel state information message.

9. An apparatus as set forth in claim 7, wherein the information comprises an identity of at least one interferer.

10. An apparatus as set forth in claim 9, wherein the identity comprises at least one of:
user equipment identity;
access point identity; and
interference sequence identity.

11. An apparatus as set forth in claim 7, wherein the apparatus is configured to provide at least one of the following:
an absolute level of interference; and
a relative level of interference.

12. An apparatus as set forth in claim 7, wherein the apparatus is configured to:
receive configuration information from the node for configuring the measuring and providing;
wherein the causing the apparatus to provide comprises causing the apparatus to:
provide, to the node at a time in accordance with the configuration information, a first information regarding the co-channel interference measurement and a second information regarding the cross-channel interference measurement.

13. A method comprising:
receiving, at an apparatus, separate cross-channel interference information and co-channel interference information for at least one user equipment, the cross-channel interference information and the co-channel interference information having been measured at the at least one user equipment, the cross-channel interference information being distinct from the co-channel interference information;
using the information for scheduling transmissions for a set of user equipment; and
receiving a channel state information message for at least one dominant interferer.

14. A method as set forth in claim 13, wherein the information is provided in a channel state information message; and
wherein the method comprises receiving an average cross-channel interference value for a plurality of interferers in the channel state information message.

15. A method as set forth in claim 13, wherein the method comprises receiving at least one of:
an indication of an absolute level of interference; and
an indication of a relative level of interference.

16. A method as set forth in claim 13, wherein the scheduling comprises scheduling transmit and receive periods of each user equipment in the set of user equipment.

17. A method as set forth in claim 13, wherein the scheduling comprises scheduling of a physical downlink shared channel.

18. A method as set forth in claim 13, wherein the method comprises providing configuration information to the at least one user equipment.

19. The method as set forth in claim 1 wherein the measuring comprises:
measuring, during a first subframe, the co-channel interference; and
measuring, during a second subframe that is different from the first subframe, the cross-channel interference.

* * * * *